US005884669A

United States Patent [19]

Braun

[11] Patent Number: 5,884,669

[45] Date of Patent: Mar. 23, 1999

[54] FUEL LINE FOR FUEL DELIVERY DEVICES OF MOTOR VEHICLES

[75] Inventor: Hans-Peter Braun, Renfrizhausen, Germany

[73] Assignee: Robert Bosch GmbH, Stuttgart, Germany

[21] Appl. No.: 875,471

[22] PCT Filed: Aug. 2, 1996

[86] PCT No.: PCT/DE96/01447

§ 371 Date: Jul. 10, 1997

§ 102(e) Date: Jul. 10, 1997

[87] PCT Pub. No.: WO97/23723

PCT Pub. Date: Jul. 3, 1997

[30] Foreign Application Priority Data

Dec. 21, 1995 [DE] Germany ........................ 1 95 47 876.2

[51] Int. Cl.[6] ........................................................ F16L 11/00

[52] U.S. Cl. .......................... 138/109; 138/121; 138/155; 138/177; 138/178

[58] Field of Search ............................. 138/99, 109, 100, 138/101, 102, 121, 155, 177, 178; 285/3, 4

[56] References Cited

U.S. PATENT DOCUMENTS

| | | | |
|---|---|---|---|
| 3,838,713 | 10/1974 | Tubb | 138/109 |
| 3,875,970 | 4/1975 | Fitter | 138/110 |
| 4,768,563 | 9/1988 | Kogge et al. | 138/155 |
| 5,037,143 | 8/1991 | Sanders et al. | 138/121 |
| 5,143,122 | 9/1992 | Adkins | 139/109 |
| 5,259,843 | 11/1993 | Watanabe et al. | 285/901 |

FOREIGN PATENT DOCUMENTS

4224981A1 2/1994 Germany .

*Primary Examiner*—Denise L. Ferensic
*Assistant Examiner*—James F. Hook
*Attorney, Agent, or Firm*—Michael J. Striker

[57] ABSTRACT

Components of the fuel delivery device can be connected with each other or with the internal combustion engine (14) by the fuel line (16). The fuel line (16) is embodied as a pipe and is fastened on a connector (20). The pipe (16) has a contact bead (36) on its exterior circumference near the connector (20). By severing the pipe (16), it is possible to create a new connector by its rest **(16*a*), which has the contact bead (36) and remains on the connector (20), on which it is possible to again fasten a new fuel line, for example in the form of a flexible hose. The preparation of the pipe (16) with the contact bead (36)** makes the easy removal of the fuel line or of the components connected therewith possible.

5 Claims, 2 Drawing Sheets

FUEL LINE FOR FUEL DELIVERY DEVICES OF MOTOR VEHICLES

BACKGROUND OF THE INVENTION

The invention is based on a fuel line for fuel delivery devices of motor vehicles.

Such a fuel line is known from DE 42 24 981 A1. In this case components of the fuel delivery device are connected with each other or with the internal combustion engine of the motor vehicle by means of the fuel line. Here the fuel line can be fastened on a connector on the components of the fuel delivery device or the internal combustion engine. In general, fuel lines can be embodied as a flexible hose or as a pipe. Pipes are more advantageous in respect to cost compared with fuel-resistant hoses, but have the disadvantage that for fastening them on the connector either elaborate connection means are required, or their direct fastening on and release from the connector is only possible by means of special mounting or dismounting devices, so that the removal of components of the fuel delivery device or of the fuel line is not possible in a simple manner.

SUMMARY OF THE INVENTION

In contrast in the embodiment of the fuel line in accordance with the invention the fuel line is formed as a pipe which has a contact bead on its exterior circumference near a connector, so that by severing the pipe a new connector can be created by a rest of the pipe which remains on the connector and includes the contact bead.

When the fuel line is designed in accordance with the present invention it has the advantage, that preparations have been made to make the simple removal of components of the fuel delivery device or of the fuel line possible. A new fuel line, for example in the form of a flexible hose, can be fastened on the new connector, which can be produced in a simple manner.

The contact bead of the pipe is formed in a simple manner by the embodiment in which the pipe is formed as a corrugated tube, and the contact bead is constituted by a corrugated section of the pipe.

BRIEF DESCRIPTION OF THE DRAWINGS

Two exemplary embodiments of the invention are represented in the drawings and are explained in more detail in the following description.

DESCRIPTION OF THE PREFERRED EMBODIMENTS

Figure 1:
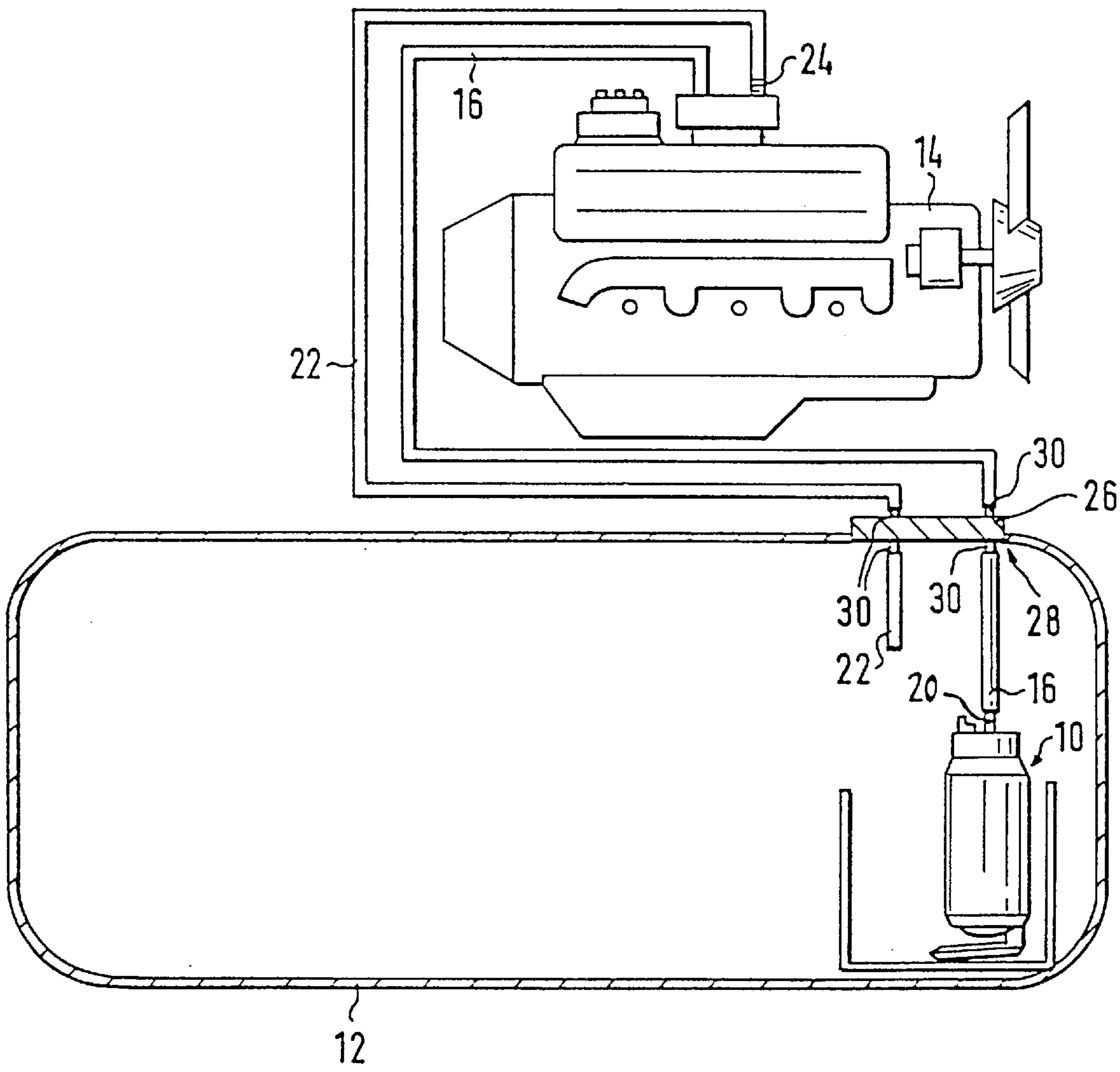
FIG. 1 shows portions of a fuel delivery device.

A fuel delivery device for motor vehicles, shown in a simplified form in FIG. 1, has a fuel delivery unit 10, which conveys fuel from a reservoir 12 to the internal combustion engine 14 of the motor vehicle. The fuel delivery unit 10 is connected with the internal combustion engine 14 via a fuel line 16, which is fastened on a connector 20 of the fuel delivery unit 10. A return from the internal combustion engine 14 to the reservoir 12 can also be a part of the fuel delivery device, through which excess fuel not used up by the internal combustion engine is returned to the reservoir 12 and which also includes a fuel line 22, which is fastened to a connector 24 on the internal combustion engine 14 and/or on the reservoir 12. A flange 26 can furthermore be a part of the fuel delivery device, by means of which an opening 28 in the reservoir 12 can be closed and which has connectors 30, on which sections of the fuel line 16 and/or 22, which are disposed inside and outside of the reservoir 12, are fastened. Further components can also be part of the fuel delivery device, on which also a fuel line is fastened on a connector.

The embodiment of the fuel line 16, fastened on the connector 20 of the fuel delivery device 10, will be described below by way of example and which can be used in the same manner for all further fuel lines of the fuel delivery device. The fuel line 16 is embodied as a pipe and can be made of a rigid plastic material. The pipe 16 can be embodied corrugated, at least in sections, in the shape of a so-called corrugated tube, so that it is possible to adapt it flexibly over its course to the respective installation conditions. The connector 20 has at least one collar 34 on its exterior circumference; preferably a plurality of collars 34, which are offset in the longitudinal direction in respect to each other, is provided. The collars 34 are slanted on their sides pointing to the free end of the connector 20 in order to make the easy slipping-on of the pipe 16 possible, and their opposite sides are arranged approximately perpendicular in respect to the longitudinal extension of the connector 20. Thus the connector 20 has the approximate shape of a fir tree, whose tip points toward the free end of the connector 20. The pipe 16 can be heated in its end area for fastening it on the connector 20, so that it expands and can be pushed on the connector 20 over the collars 34. During cooling the pipe 16 shrinks again, wherein the collars 34 dig into it and in this way keep the pipe 16 on the connector 20 so that it cannot be pulled off again. Alternatively the pipe 16 can also be mounted without heating, wherein its end is pushed by means of an appropriate force on the connector 20. The plastic material of the pipe 16 settles in the maximal pressure area, so that it clings to the fir tree profile of the connector 20 and in this way secures the pipe 16 against being pulled off.

Figure 2:
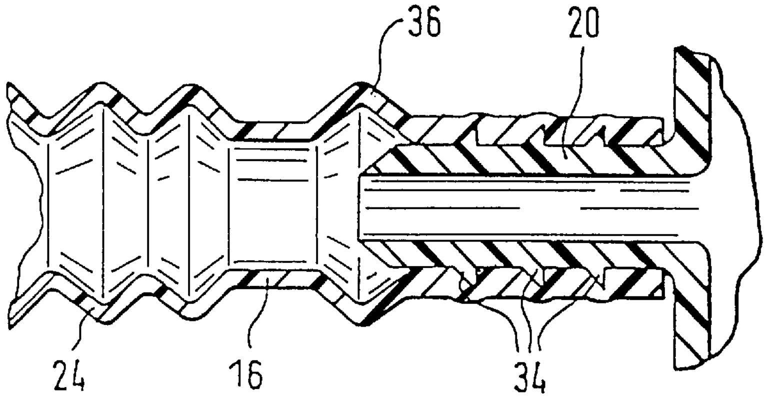
FIG. 2 a pipe of the fuel delivery device in accordance with a first exemplary embodiment, used for fuel delivery and arranged on a connector, FIG. 3 the connector with the severed pipe arranged on it and the new fuel line fastened on it, and FIG. 4 the pipe in accordance with a second exemplary embodiment.
Figure 3:
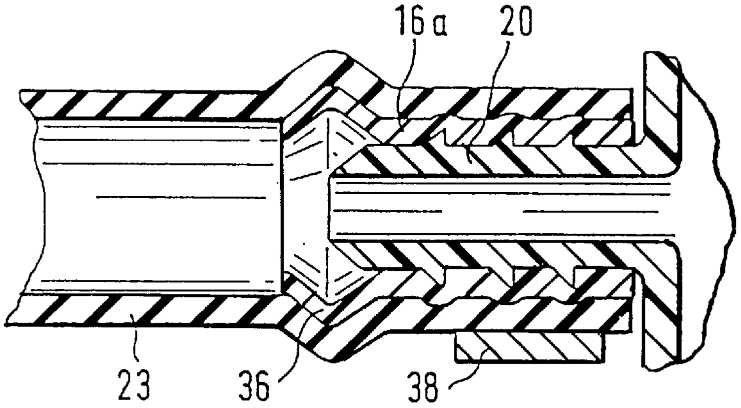

In a first exemplary embodiment represented in FIGS. 1 and 2, the pipe 16 has an outward projecting contact bead 36 near the connector 20 in an area on its exterior circumference projecting past the connector 20. The contact bead 36 can be advantageously constituted by a corrugated section of the pipe 16, of which several, as described above, are lined up and form a section of the pipe 16 in the shape of a corrugated pipe, which is flexibly displaceable. If the removal of the pipe 16 or of the fuel delivery unit 10 is necessary, the pipe 16 can be severed in such a way that a rest **16*a* with the contact bead 36 remains at the connector 20, as represented in FIG. 3. The rest 16*a* then forms a new connector, on which a new fuel line 23 in the form of a flexible hose can be fastened. The pipe 16 is preferably severed directly behind the contact bead 36, so that the free end of the rest 16*a* tapers approximately conically, because of which the subsequent slipping-on of the hose 23 is made easier. Since the contact bead 36 projects past the connector 20 it is assured, that when severing the pipe 16 the connector 20 is also not partially severed. The contact bead 36 prevents the hose 23 from slipping off and, if required, the hose can be additionally secured by means of a hose clamp 38 on the rest 16*a* arranged on the connector 20. Outside of the contact bead 36, the rest 16*a* of the pipe 16 remaining on the connector 20 is embodied to be smooth on its exterior circumference, i.e. the collars 34 do not press through it, so that the connection of the hose 23** with the new connector is permanent.

Figure 4:
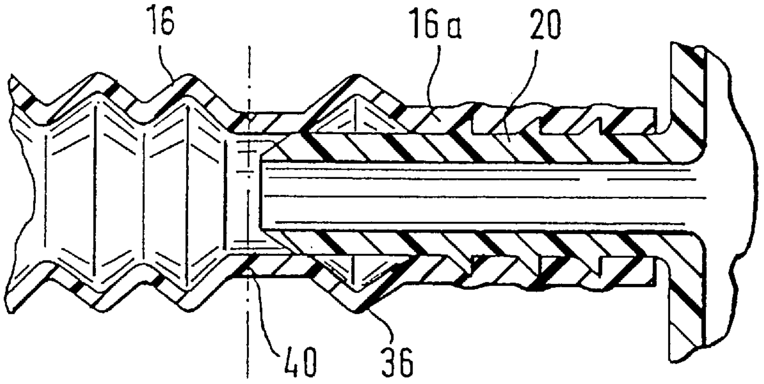

The pipe 16 in accordance with a second exemplary embodiment is represented in FIG. 4, wherein the contact bead 36 is disposed on the area of the pipe 16 arranged on the connector 20. In this case the pipe 16 can have a marking 40 on its area extending past the connector 20, for example in the shape of a notch, where the pipe 16 is to be severed without also cutting off a piece of the connector 20. In this case the contact connector 36 can terminate at approximately the same height as the connector 20, or even on the connector 20, so that a smooth section of the rest 16*a* of the pipe 16 remains on the connector 20 after the former has been severed.

I claim:

1. A fuel line of fuel delivery devices of motor vehicles for connecting components of the fuel delivery device with each other or with an internal combustion engine of a motor vehicle, the fuel line comprising a connector provided on one of the components of the fuel delivery device or on the internal combustion engine; an integral pipe which forms a fuel line and has an exterior circumference provided with a contact bead near said connector and formed so that by severing said pipe a rest portion of said pipe remains on said connector a new connector is formed by said rest portion of said pipe which is integral with said contact bead, and then another integral pipe can be attached on said new connector.

2. A fuel line as defined in claim 1, wherein said pipe is formed at least in sections as a corrugated tube, said contact bead being constituted by a corrugated section of said pipe.

3. A fuel line as defined in claim 1, wherein said contact bead is disposed on a section of said pipe which projects past said connector.

4. A fuel line as defined in claim 1, wherein said contact bead is disposed on a section of said pipe which is located on said connector.

5. A method of making a fuel line of fuel delivery devices of motor vehicles for connecting comments of the fuel delivery devices in which other or with an internal combustion engine of a motor vehicle, comprising the steps of providing a connector on one of the components of the fuel delivery device or of the internal combustion engine; fastening an integral pipe which forms a fuel line on said connector; providing a contact bead on a exterior circumference of said pipe near the connector; and severing the pipe so as to form a new connector by a rest portion of the pipe which remains on the connector and is integral with the contact bead, and then another integral pipe can be attached on said new connector.

* * * * *